US012669720B2

(12) United States Patent
Song

(10) Patent No.: US 12,669,720 B2
(45) Date of Patent: Jun. 30, 2026

(54) CONTACT LENSES HAVING MULTIPLE WAVE PLATE

(71) Applicant: IUCF-HYU (INDUSTRY-UNIVERSITY COOPERATION FOUNDATION HANYANG UNIVERSITY), Seoul (KR)

(72) Inventor: Seok Ho Song, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 254 days.

(21) Appl. No.: 18/669,065

(22) Filed: May 20, 2024

(65) Prior Publication Data

US 2024/0310655 A1 Sep. 19, 2024

Related U.S. Application Data

(63) Continuation of application No. PCT/KR2022/018056, filed on Nov. 16, 2022.

(30) Foreign Application Priority Data

Nov. 19, 2021 (KR) ........................ 10-2021-0160450
Feb. 14, 2022 (KR) ........................ 10-2022-0019133

(51) Int. Cl.
*G02C 7/04* (2006.01)
*G02B 5/30* (2006.01)
(52) U.S. Cl.
CPC ............. *G02C 7/04* (2013.01); *G02B 5/3083* (2013.01)

(58) Field of Classification Search
None
See application file for complete search history.

(56) References Cited

U.S. PATENT DOCUMENTS 4,848,894 A * 7/1989 Buser ..................... G02C 7/104
351/159.29
4,881,805 A * 11/1989 Cohen .................. G02B 5/1876
623/6.3

(Continued)

FOREIGN PATENT DOCUMENTS

CN 110897762 A 3/2020
KR 10-2001-0033714 A 4/2001

(Continued)

OTHER PUBLICATIONS

International Search Report issued from the WIPO dated Feb. 17, 2023 for the PCT International Application No. PCT/KR2022/018056.

(Continued)

*Primary Examiner* — Sharrief I Broome
*Assistant Examiner* — Journey F Sumlar

(57) ABSTRACT

A contact lens made of multilayer wave plates includes two or more wave plates disposed between a corneal protective layer and lens surface layer thereof to increase the number of focal points. More particularly, the contact lens includes a lens surface layer; a corneal protective layer; and a wave plate layer in which two or more wave plates composed of a birefringent material are stacked and which is disposed between the lens surface layer and the corneal protective layer, and phases of neighboring wave plates in the wave plate layer have opposite phase signs so as to complement each other.

18 Claims, 15 Drawing Sheets

(56) References Cited

U.S. PATENT DOCUMENTS

| | | | | |
|---|---|---|---|---|
| 5,017,000 | A * | 5/1991 | Cohen | A61F 2/1618 |
| | | | | 359/721 |
| 5,056,908 | A * | 10/1991 | Cohen | G02C 7/042 |
| | | | | 623/6.31 |
| 7,188,949 | B2 | 3/2007 | Bandhauer et al. | |
| 9,753,193 | B2 | 9/2017 | Tabirian et al. | |
| 10,120,112 | B2 | 11/2018 | Tabirian et al. | |
| 10,712,564 | B2 * | 7/2020 | Lemoff | G02B 17/061 |
| 2010/0053549 | A1 * | 3/2010 | Legerton | G02C 7/104 |
| | | | | 264/1.32 |
| 2015/0029459 | A1 * | 1/2015 | Tabirian | B29D 11/00125 |
| | | | | 351/158 |
| 2015/0081016 | A1 * | 3/2015 | De Sio | A61F 2/1648 |
| | | | | 623/6.22 |
| 2016/0047956 | A1 | 2/2016 | Tabirian et al. | |
| 2016/0363784 | A1 | 12/2016 | Beaton et al. | |
| 2019/0041633 | A1 | 2/2019 | Zalevsky et al. | |
| 2019/0285890 | A1 | 9/2019 | Lam et al. | |
| 2021/0240010 | A1 * | 8/2021 | Portney | G02C 7/06 |

FOREIGN PATENT DOCUMENTS

| | | |
|---|---|---|
| KR | 10-0782288 B1 | 12/2007 |
| KR | 10-1650293 B1 | 8/2016 |
| WO | 2016-021075 A1 | 2/2016 |
| WO | 2020179012 A1 | 9/2020 |

OTHER PUBLICATIONS

Written Opinion of International Search Authority issued from the WIPO dated Feb. 17, 2023 for the PCT International Application No. PCT/KR2022/018056.

EESR—Extended European Search Report, issued by European Patent Office, on Oct. 14, 2025, for the Ruropean Patent Application No. 22896044.9.

* cited by examiner

30

20

10

(a) Phase distribution in odd-numbered wave plate (b) Phase distribution in even-numbered wave plate (a) h=λ/2

(b) h=λ/3

(c) h=λ/4

CONTACT LENSES HAVING MULTIPLE WAVE PLATE

CROSS-REFERENCE TO RELATED APPLICATION

This application is a bypass continuation of PCT International Application No. PCT/KR2022/018056, which was filed on Nov. 16, 2022, and which claims priority to and the benefit of Korean Patent Application No. 10-2021-0160450, filed with the Korean Intellectual Property Office on Nov. 19, 202 and Korean Patent Application No. 10-2022-0019133, filed with the Korean Intellectual Property Office on Feb. 14, 2022, the disclosures of which are incorporated herein by reference in its entirety.

TECHNICAL FIELD

The present disclosure relates to a contact lens made of multilayer wave plates, and more particularly to a contact lens made of multilayer wave plates, the contact lens including two or more wave plates disposed between a corneal protective layer and lens surface layer of a contact lens to increase the number of focal points

BACKGROUND ART

Common conditions that cause poor vision include myopia and hyperopia. These conditions are usually due to an imbalance between the length of the eye and the focal point of the eye's optical elements. In myopic eyes, the focal points are set in front of the retinal plane, and in hyperopic eyes, the focal points are set in the back of the retinal plane. Myopia typically occurs because the axial length of the eye grows longer than the focal length of the eye's optical components, meaning the eye grows too long. Hyperopia typically occurs because the axial length of the eye is too short compared to the focal length of the eye's optical components, meaning the eye does not grow long enough.

The ability to adjust focal length, i.e., to focus on near and distant objects without relying on changes in focal length, can be improved by using intraocular multifocal lenses or contact lenses. Multifocal lenses have different focal lengths for near and far vision.

Among the techniques for manufacturing multifocal diffractive lenses, a method involving a diffractive wave plate element made of a birefringent material is known. This method has the advantage of a relatively easy manufacturing process and low cost.

As a related art regarding multifocal lenses having a diffractive wave plate element, there is U.S. Pat. No. 9,753, 193 (METHODS AND APPARATUS FOR HUMAN VISION CORRECTION USING DIFFRACTIVE WAVE-PLATE LENSES).

However, in U.S. Pat. No. 9,753,193, the overall structure is made of a single thin film layer. Accordingly, the fast and slow axes of birefringent materials arranged in the single thin film layer should be properly arranged to form double or more multi-focal points while minimizing phase distribution and optical aberration, but this process is very complex.

DISCLOSURE

Technical Problem

Therefore, the present disclosure has been made in view of the above problems, and it is one object of the present disclosure to provide a contact lens made of multilayer wave plates that are stacked to have complementary phases to each other in the contact lens, thereby being capable of increasing the number of focal points compared to an existing contact lens.

Technical Solution

In accordance with an aspect of the present disclosure, the above and other objects can be accomplished by the provision of a contact lens made of multilayer wave plates, the contact lens including: a lens surface layer; a corneal protective layer; and a wave plate layer in which two or more wave plates composed of a birefringent material are stacked and which is disposed between the lens surface layer and the corneal protective layer, and phases of neighboring wave plates in the wave plate layer have opposite phase signs so as to complement each other.

In an embodiment of the present disclosure, when a thickness of one or more wave plates in the wave plate layer changes, light intensity at a position where focal points are formed may change accordingly.

In an embodiment of the present disclosure, a thickness of the wave plate layer changes such that a light intensity at a position where one focal point is formed becomes 0, the number of focal points may change.

In an embodiment of the present disclosure, the number of focal points generated by the wave plate layer may be calculated by Equation 1 below:

$$N = 4 \times 2^{m-1} - 1 \qquad \langle \text{Equation 1} \rangle$$

where N represents the maximum number of focal points, and m represents the number of wave plates.

In an embodiment of the present disclosure, positions of focal points generated by the wave plate layer may be calculated as shown in Equation 2 below according to the number of the wave plates:

$$\frac{1}{f_N} = \frac{1}{f_{FL}} + \frac{1}{f_{WL-1}} + \frac{1}{f_{WL-2}} + \dots + \frac{1}{F_{WL-N}} \qquad \langle \text{Equation 2} \rangle$$

where $f_N$ represents a focal length after passing through a last wave plate, and $f_{WL-N}$ represents a focal length of each wave plate.

In an embodiment of the present disclosure, when a phase section (X) between a center of the wave plate layer and a point where a phase changes suddenly changes, positions where focal points are formed may change accordingly.

In an embodiment of the present disclosure, in a same phase section (X) between neighboring first and second wave plates in the wave plate layer, a phase in the second wave plate may decrease as a phase in the first wave plate increases.

In an embodiment of the present disclosure, the wave plate layer may be disposed in a central region of the corneal protective layer.

In an embodiment of the present disclosure, the wave plate layer disposed in the central region may have a smaller area than the corneal protective layer.

In an embodiment of the present disclosure, among the wave plate layer, one wave plate layer may be disposed in a central region of the corneal protective layer, and another wave plate layer may be disposed in a peripheral region excluding the central region at a certain distance spaced from the central region in a direction outside the central region.

In an embodiment of the present disclosure, the wave plate layer disposed in the peripheral region may be formed in an annular shape with a certain thickness.

In an embodiment of the present disclosure, a plurality of wave plate layers may be formed in an annular shape with a certain thickness in the peripheral region, may have different radii, and may be arranged at a certain distance away from an adjacent wave plate layer.

In an embodiment of the present disclosure, the wave plate layer may be disposed in a peripheral region excluding a central region of the corneal protective layer.

In an embodiment of the present disclosure, the wave plate layer may be formed to surround a periphery of the corneal protective layer.

In an embodiment of the present disclosure, the wave plate layer may be formed inside the corneal protective layer.

In an embodiment of the present disclosure, the wave plate layer may be formed in an annular shape with a certain thickness.

In an embodiment of the present disclosure, among the wave plate layer, one wave plate layer may be disposed in a first peripheral region excluding a central region of the corneal protective layer, and another wave plate layer may be disposed in a second peripheral region spaced a certain distance away from the first peripheral region in an outer direction of the first peripheral region.

In an embodiment of the present disclosure, a plurality of wave plate layers may be formed in an annular shape with a certain thickness in the second peripheral region, may have different radii and may be arranged at a certain distance away from an adjacent wave plate layer.

Advantageous Effects

According to the present disclosure, the number of focal points can increase in proportion to the number of wave plates. By using this, a contact lens with multi-focal points can be easily manufactured.

In addition, the present disclosure can be applied not only to vision correction but also to industrial fields that require multifocal lenses such as microscopes and cameras.

In addition, in the present disclosure, the total number of wave plates, the curvature of a lens surface layer and the refractive index distribution of each wave plate can be varied to achieve the refractive compensation required for distance and near vision with other lenses in the visual system.

Further, the degree of light intensity at positions where focal points are formed can be changed by changing the thickness of the wave plates, and the number of focal points can be adjusted within the maximum number of focal points.

BEST MODE

Figure 1:
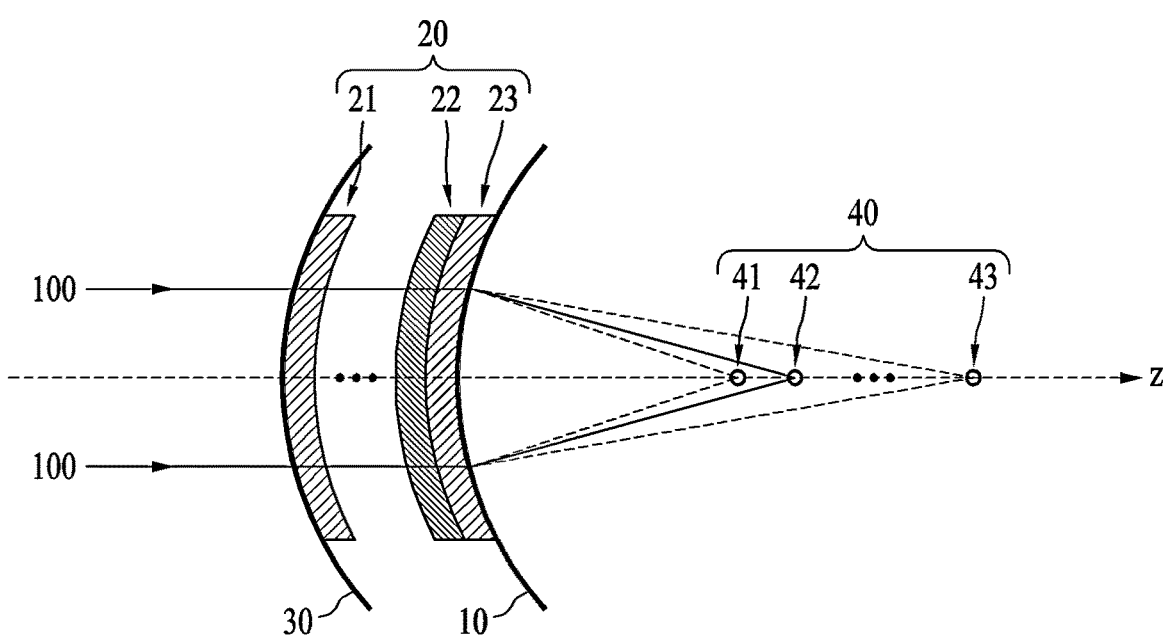
FIG. 1 illustrates the overall structure of a contact lens made of multilayer wave plates according to an embodiment of the present disclosure.

Hereinafter, a contact lens made of multilayer wave plates according to a preferred embodiment will be described in detail with reference to the attached drawings. Here, the same symbols are used for the same components, and repetitive descriptions and detailed descriptions of known functions and configurations that may unnecessarily obscure the gist of the disclosure are omitted. Embodiments of the disclosure are provided to more completely explain the present disclosure to those with average knowledge in the art. Therefore, the shapes and sizes of elements in the drawings may be exaggerated for clearer explanation.

Figure 2:
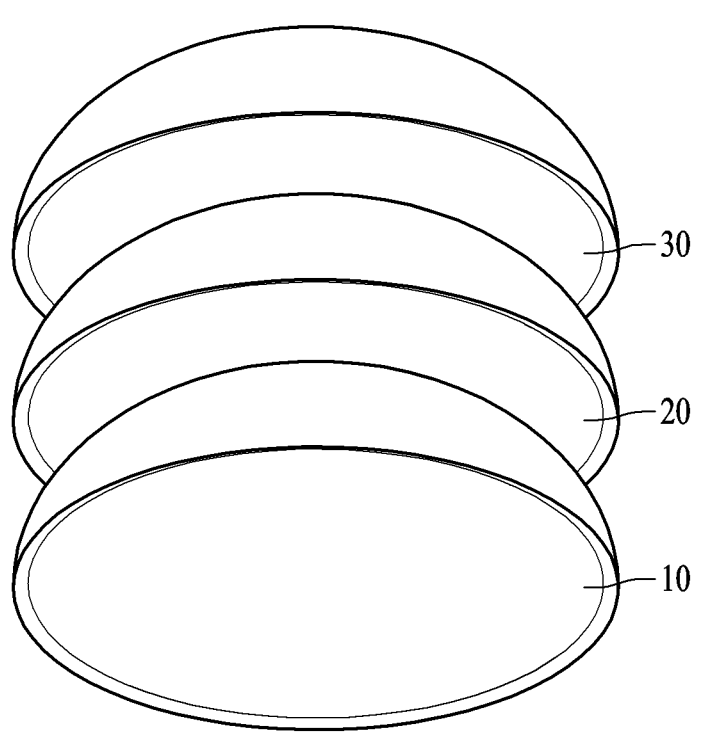
FIGS. 2 and 3 illustrate the structure of the structure of the contact lens made of multilayer wave plates according to an embodiment of the present disclosure.
Figure 3:
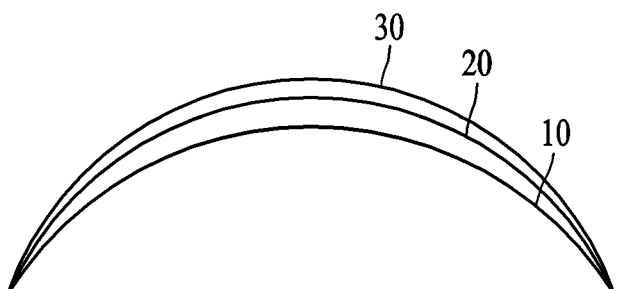

FIG. 1 illustrates the overall structure of a contact lens made of multilayer wave plates according to an embodiment of the present disclosure, and FIGS. 2 and 3 illustrate the structure of the structure of the contact lens made of multilayer wave plates according to an embodiment of the present disclosure.

Referring to FIGS. 1 to 3, the contact lens made of multilayer wave plates according to an embodiment of the present disclosure includes a corneal protective layer 10, a wave plate layer 20 and a lens surface layer 30.

The corneal protective layer 10 is in direct contact with the eyeball when worn. Accordingly, the corneal protective layer 10 has a convex shape with approximately constant curvature depending on the shape of the eyeball. The size or thickness of the corneal protective layer 10 may be set in various ways depending on the designer's intention.

The lens surface layer 30 is exposed to the outside when worn on the eyeball. The lens surface layer 30 is formed to have a certain thickness to determine the power of the eye. The lens surface layer 30 has a convex shape with approximately constant curvature, and is preferably formed with a smooth surface for natural contact with the eyelid when worn.

The wave plate layer 20 includes a stack of two or more wave plates 21, 22 and 23, and is placed between the corneal protective layer 10 and the lens surface layer 30. The wave plate layer 20 may be composed of a total of m (m≥2) wave plates from the first wave plate 21 to the last wave plate 23. FIG. 1 shows a stack of three or more wave plates, but as described above, two or more wave plates are stacked.

The wave plates 21, 22 and 23 are optical elements that change the polarization state of light, and are lenses (wave-plate lens: WL) made of birefringent material. A wave plate 200 is also called a phase retardation plate. In a phase retardation plate, a polarization direction in which the speed of light is fast is called a fast axis, and a polarization direction having an axis perpendicular to the fast axis and a slow light speed is called a slow axis. The phase retardation plate includes a Half Wave Plate (HWP) which retards the phase of $\lambda/2$; and a Quarter Wave Plate (QWP) which retards the phase of $\lambda/4$. For example, when a linearly polarized beam passes at an angle of $\theta$ with the fast axis of the HWP, it is rotated and polarized by $2\theta$, and when the linearly polarized beam passes at an angle of 45 degrees with the fast axis of the QWP, a circularly polarized beam is produced. The polarization conversion technology of linearly polarized or circularly polarized beams that have passed through the HWP and the QWP is a known technology, so a detailed description thereof is omitted in this specification.

Figure 4:
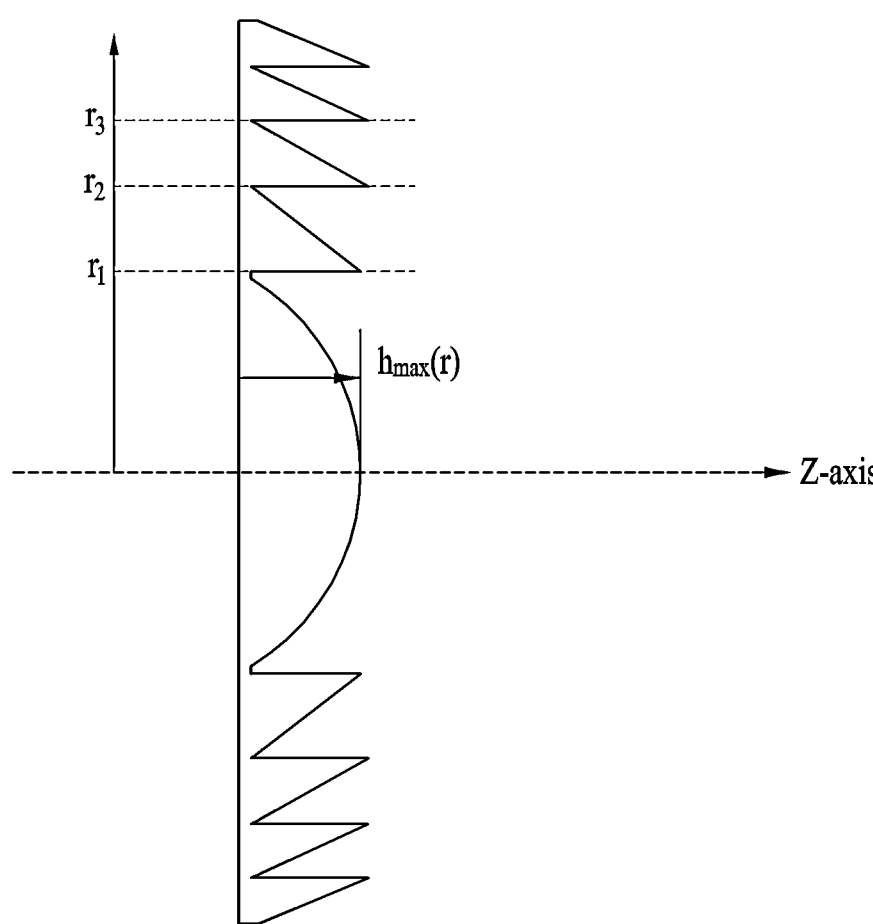
FIG. 4 illustrates the cross section of an existing diffractive lens.

FIG. 4 illustrates the cross section of an existing diffractive lens.

Meanwhile, in the case of a diffractive lens commonly known as the Fresnel lens, the diffractive lens has a sawtooth shape as the radius from the center of the diffraction lens increases, as shown in FIG. 4, and it has a phase distribution as shown in Equation 1 below depending on the size of the radius:

$$\Phi(r) = 2\pi \times \left\{ j - \frac{r_j^2}{(2\lambda F)} \right\} \qquad \langle \text{Equation 1} \rangle$$

where $r_j$ represents the jth radius based on the center of a diffraction lens, $\lambda$ represents the wavelength length of incident light, and F represents the central focal length of the diffraction lens.

In addition, as the phase distribution shown in Equation 1 moves away from the diffraction lens, several focal points are formed as shown in Equation 2 below:

$$F_m = \frac{F}{m} \qquad \langle \text{Equation 2} \rangle$$

where m represents the diffraction order of a diffraction lens.

Unlike the shape of the Fresnel lens described above, the wave plates 21, 22 and 23 according to the present disclosure are formed in an annular shape, and are manufactured to have a constant thickness depending on the distance from the center of the wave plates 21, 22 and 23 to perform the function of a Fresnel lens. Here, when incident light has a left-handed circular polarization (LHCP) or a right-handed circular polarization (RHCP), a phase distribution with multi-focal points similar to Equations 1 and 2 may be formed by adjusting the arrangement direction of the fast axis and slow axis of the wave plate according to the present disclosure.

The wave plates 21, 22 and 23 according to an embodiment of the present disclosure are transparent materials and may be composed of an anisotropic material such as liquid crystal or, more generally, reactive mesogen. The thickness of the wave plates 21, 22 and 23 may be smaller than the wavelength of the incident light 100, equal to the wavelength of the incident light 100, or thicker than the wavelength of the incident light 100.

Regarding a manufacturing method of the wave plates 21, 22 and 23 according to an embodiment of the present disclosure, a previous research paper "J-H. Kim et al. "Fabrication of ideal geometric-phase holograms with arbitrary wavefronts", Optica Vol. 2, No. 11, November (2015)" may be referred to. According to the previous research paper, the wave plates 21, 22 and 23 are manufactured by forming a pattern for controlling optical axis rotation at their local positions. Here, as methods of patterning the optical axis rotation of the anisotropic material that makes up, there are a rubbing method of forming fine grooves on the surface of the wave plates 21, 22 and 23 by a mechanical method, a photo-alignment method of arranging incident light in a certain direction according to the polarization of the incident light, and the like.

Meanwhile, in the wave plate layer 20, an odd-numbered wave plate (e.g., the first wave plate 21) and an even-numbered wave plate (e.g., the second wave plate 22) are arranged adjacent to each other. When the incident light 100 passes through the last wave plate 23 of the present disclosure, multi-focal points 40 are formed. As shown in FIG. 1, the multi-focal points 40 may be composed of a total of n focal points from the first focal point 41 to the last focal point 43. The number of focal points formed according to an embodiment of the present disclosure is described below.

Figure 5:
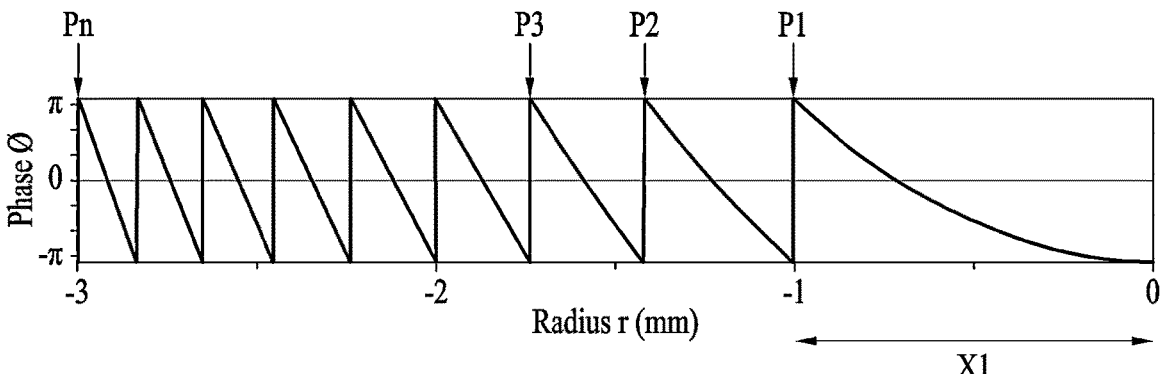
FIG. 5 illustrates the phase distribution of wave plates according to an embodiment of the present disclosure.
Figure 5:
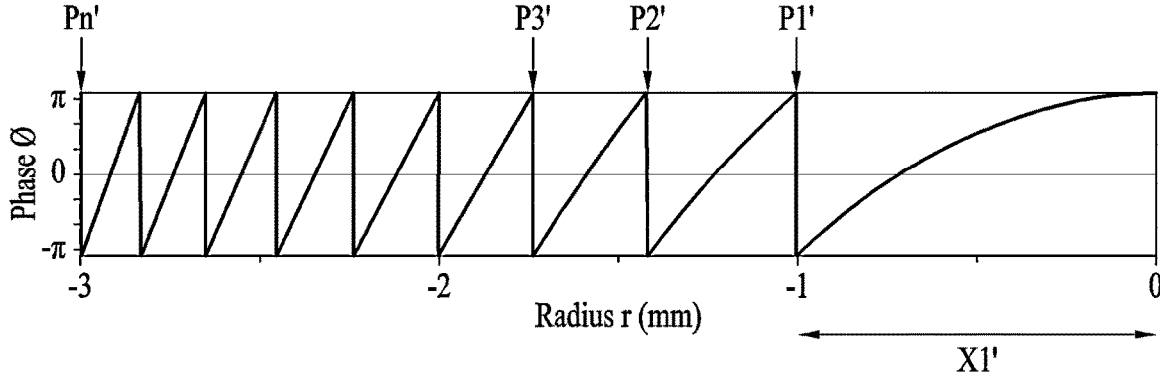

FIG. 5 illustrates the phase distribution of wave plates according to an embodiment of the present disclosure.

Now, the phase distribution of the wave plates 21, 22 and 23 of the present disclosure is examined. FIG. 5 illustrates a phase distribution representing the phase difference of a light ray passing through a position separated by a radius r from the center of the optical axis (a point where r=0) in the transmitted wavefront incident on the wave plate. The phase difference distribution shown in FIG. 5 is within the wavelength range of incident light and has a sawtooth cross-section.

The graph of FIG. 5(a) illustrates the phase distribution shown in the odd-numbered wave plate, and the graph of FIG. 5(b) illustrates the phase distribution shown in the even-numbered wave plate. Examining the phase distribution, a point where the phase suddenly changes (changes from $+\pi$ to $-\pi$ or from $-\pi$ to $+\pi$) appears as the radius increases. In FIG. 5, points, where the phase suddenly changes, in the phase distribution of the odd-numbered wave plate are indicated as P1 to Pn, and points, where the phase changes suddenly, in the phase distribution of the even-numbered wave plate are indicated as P1' to Pn'. The phase position Pn corresponds to the position of $r_j$ in Equation 1. Here, the phase section from the center (r=0) to P1 is called the X1 section, and the phase section from the center (r=0) to P1' is called the X1' section. Although not illustrated in FIG. 3, phase sections up to P2 and P2' based on the center (r=0) are called X2 and X2' sections, respectively, and the following phase sections may be displayed in the above-described manner. In this specification, a section from X1 to the subsequent phase section and a section from X1' to the subsequent phase section are collectively referred to as the X section.

Referring to the phase distribution according to an embodiment of the present disclosure of FIG. 5 again, in the same phase section (X), the phase in the even-numbered wave plate decreases while the phase in the odd-numbered wave plate increases. That is, the phase sign (+q) of the odd-numbered wave plate and the phase sign (−q) of the even-numbered wave plate should be opposite to each other. In this specification, this relation is called a complementary relation. Here, the values (absolute values) of phase magnitudes may be the same or different.

Here, when the wave plates 21, 22 and 23 are manufactured to vary the spacing of the X section, the positions at which the focal points are formed may be adjusted. Specifically, referring to FIG. 5 and Equation 1, when one of the wave plates 21, 22 and 23 is manufactured, a phase value in a range of $-\pi \sim +\pi$ and a phase position (Pn or $r_j$) are determined. When the wave plates 21, 22 and 23 are manufactured such that the spacing of the X section varies, the phase position (Pn or $r_j$) is changed, and the focal length (F in Equation 1) is also changed. For example, as the spacing of the X section decreases, the focal length also decreases.

Meanwhile, according to another embodiment of the present disclosure, in the same phase section (X), the phase in the odd-numbered lens wave plate may decrease, and the phase in the even-numbered lens wave plate may increase.

The wave plate layer 20 may have a convex shape with a certain curvature such that it is naturally disposed on the corneal protective layer 10 and the lens surface layer 30.

Meanwhile, the total number of layers of the wave plates, the curvature of the surface of the corneal protective layer 10 and lens surface layer 30, the birefringent refractive index distribution of each of the wave plates, and the like may be varied to achieve the refractive correction needed for distance and near vision with other lenses in a user's visual system.

Hereinafter, to investigate the effects of the contact lens made of multilayer wave plates according to the present disclosure, the case where one wave plate is arranged and the case where wave plates whose phase distributions are not complementary to each other are arranged next to each other are compared with the contact lens made of multilayer wave plates according to the present disclosure.

Figure 6:
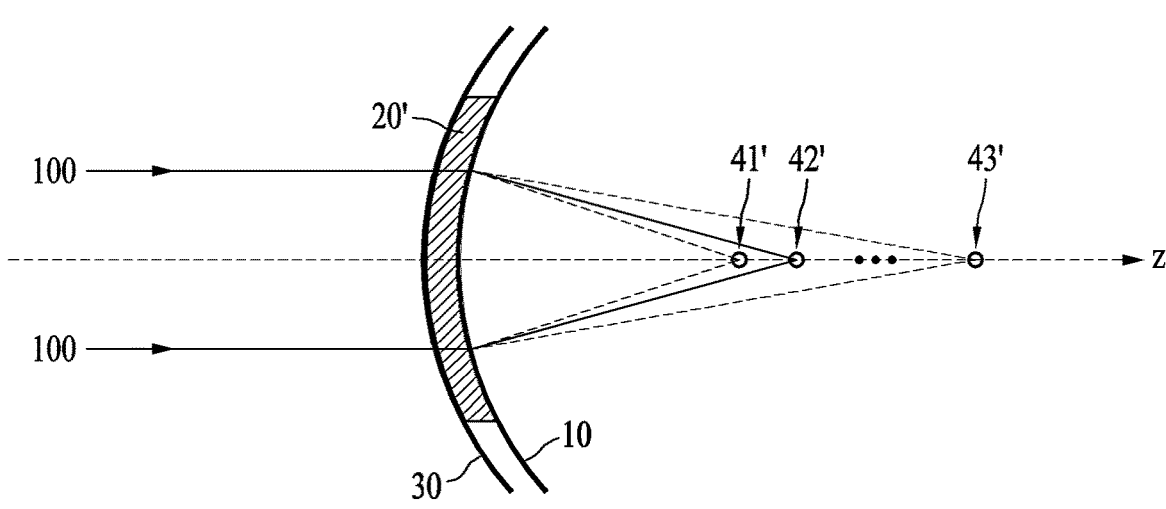
FIG. 6 illustrates a state in which one wave plate is disposed on a contact lens.
Figure 7:
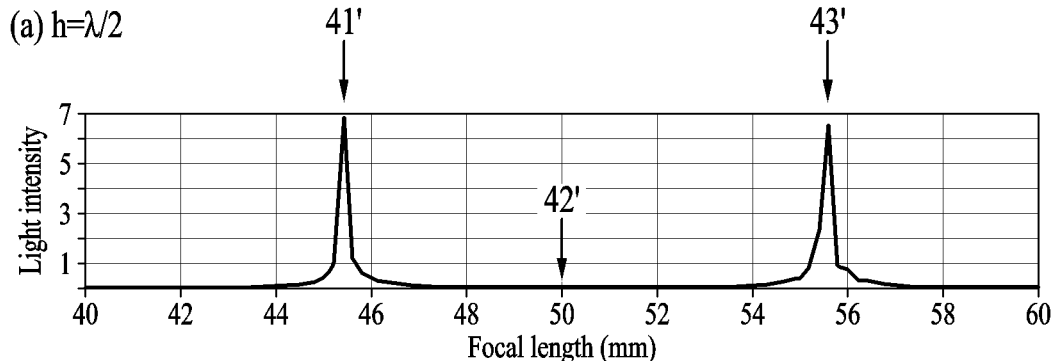
FIG. 7 illustrates focal point positions and light intensity distribution according to changes in the thickness of the wave plate of FIG. 6.
Figure 7:
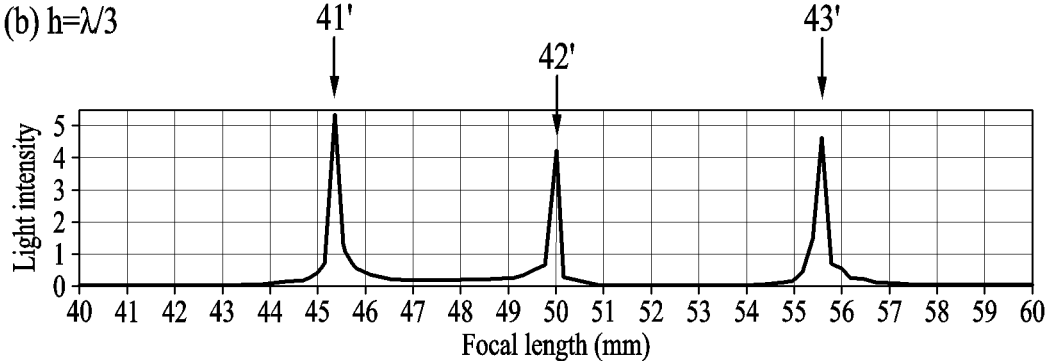
Figure 7:
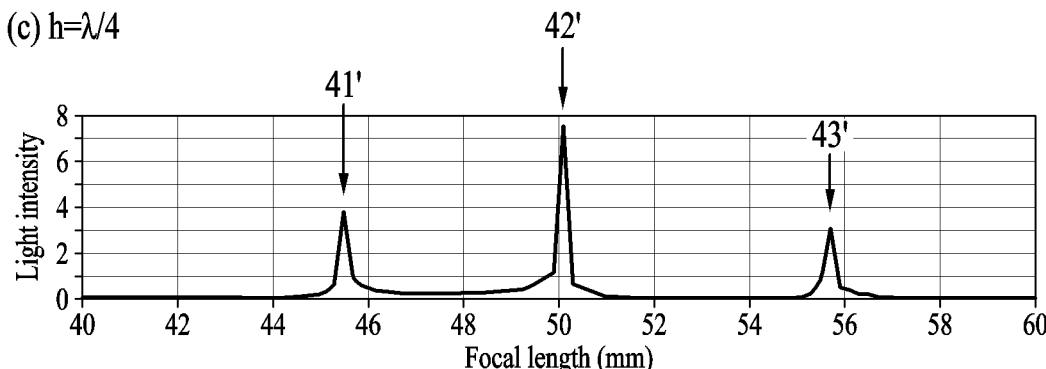

FIG. 6 illustrates a state in which one wave plate is disposed on a contact lens, and FIG. 7 illustrates focal point positions and light intensity distribution according to changes in the thickness of the wave plate of FIG. 6.

Referring to FIGS. 6 and 7, when only one wave plate 20' is disposed between the corneal protective layer 10 and the lens surface layer 30 and linearly polarized light 100 is incident, three focal points 41', 42' and 43' are formed. As shown in FIG. 7, when the thickness (h) of the wave plate is $\lambda/2$, $\lambda/3$ and $\lambda/4$, light intensity appears at each focal point. As such, in the case of the contact lens where only one wave plate 20' is disposed, the total number of focal points is limited to a maximum of three. Meanwhile, it can be seen that the light intensity at each focal point position changes when the thickness (h) of the wave plate changes.

Figure 8:
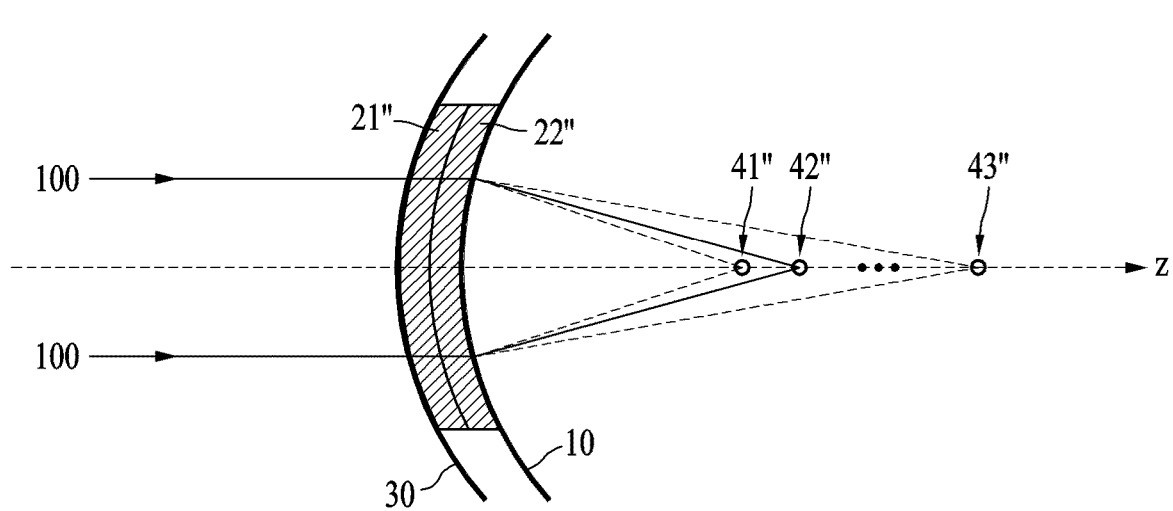
FIG. 8 illustrates a contact lens in which two non-complementary wave plates are stacked and arranged.
Figure 9:
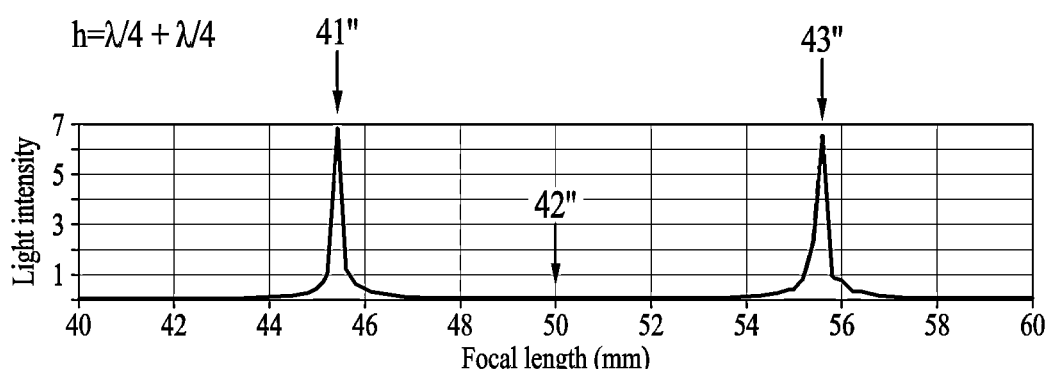
FIG. 9 illustrates focal point positions and light intensity distribution when the thickness of each of the wave plates of FIG. 8 is λ/4.

FIG. 8 illustrates a contact lens in which two non-complementary wave plates are stacked and arranged, and FIG. 9 illustrates focal point positions and light intensity distribution when the thickness of each of the wave plates of FIG. 8 is 24.

Referring to FIGS. 8 and 9, a first wave plate 21" and second wave plate 22" are stacked and arranged between a corneal protective layer 10 and a lens surface layer 30. Here, the first wave plate 21" and the second wave plate 22" are arranged adjacent to each other, but the phase distributions of the wave plates 21" and 22" are not complementary to each other. In addition, when the thickness of each of the wave plates is $\lambda/4$, the total thickness is $\lambda/2$.

This is a case where the thickness of the wave plate is $\lambda/2$, and the total number of focal points is limited to a maximum of three (see FIG. 7(a)).

When the multiple wave plates 21" and 22" that are not complementary to each other are arranged in a contact lens, the maximum number of focal points may be obtained as in Equation 3 below:

$$N = 2m + 1 \qquad \langle \text{Equation 3} \rangle$$

where N represents the maximum number of focal points, and m represents the number of wave plates.

In addition, Equation 3 may be applied also when one wave plate is disposed in a contact lens.

Figure 10:
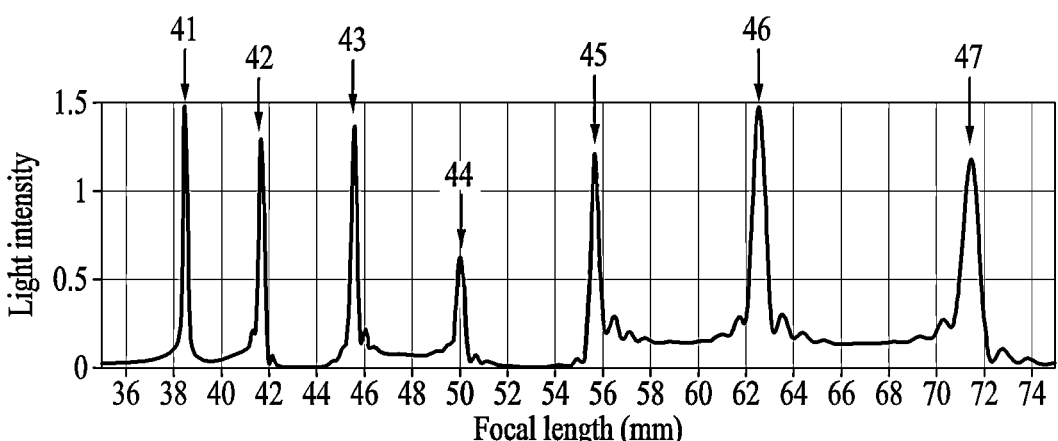
FIG. 10 illustrates multiple focal points formed when two wave plates whose phases are complementary to each other are stacked and arranged in the contact lens according to an embodiment of the present disclosure.
Figure 11:
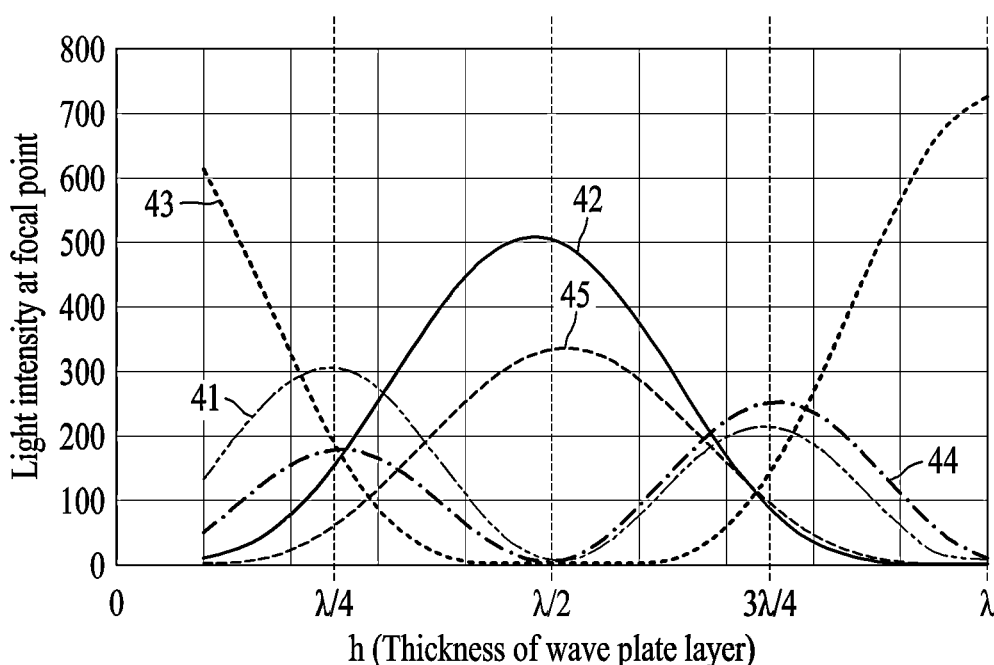
FIG. 11 illustrates light intensity changes at each focal point position which is dependent upon changes in the thickness of the wave plate layer in the contact lens according to an embodiment of the present disclosure.

FIG. 10 illustrates multiple focal points formed when two wave plates whose phases are complementary to each other are stacked and arranged in the contact lens according to an embodiment of the present disclosure, and FIG. 11 illustrates light intensity changes at each focal point position which is dependent upon changes in the thickness of the wave plate layer in the contact lens according to an embodiment of the present disclosure.

Referring to FIGS. 10 and 11, two wave plates 21 and 22 are stacked and arranged in a contact lens. Here, the first wave plate 21 and the second wave plate 22 are arranged adjacent to each other, and the phase distributions of the wave plates 21 and 22 are complementary to each other. In addition, the thickness of each of the wave plates is $\lambda/4$, the total thickness is $\lambda/2$. The maximum number of focal points formed by these multifocal lenses is seven.

When multiple wave plates in a complementary relation are arranged in the contact lens in such a manner, the maximum number of focal points increases.

As described above, the magnitudes of phases may be different when the first wave plate 21 and the second wave plate 22 are in a complementary relation. Here, when the magnitudes of the phases are different, the value of light intensity may be changed without changing the number of focal points.

The maximum number of focal points when multiple wave plates in a complementary relation are arranged in a contact lens may be obtained as shown in Equation 4 below:

$$N = 4 \times 2^{m-1} - 1 \qquad \langle \text{Equation 4} \rangle$$

where N represents the maximum number of focal points, and m represents the number of wave plates.

FIG. 11 illustrates a light intensity change at each focal point position which is dependent upon a change in the thickness of the wave plate layer in the contact lens according to an embodiment of the present disclosure.

The value calculated by Equation 4 is the maximum number of focal points, and may adjust the number of focal points within the limit of the maximum number of the focal points by the thickness of the wave plate, i.e., by adjusting the light intensity at each focal point position. For example, when the thickness of at least one wave plate is adjusted to set the light intensity at at least one focal point position to 0 in the case where seven focal points are formed by the multifocal lenses of the present disclosure, the effect of disappearing the focal point at the position may be obtained, thereby reducing the total number of focal points.

FIG. 11 illustrates a change in light intensity at each focal point position as the thickness (h) of the wave plate increases from 0 to λ when five focal points 41, 42, 43, 44 and 45 are formed. For example, when the thickness (h) of the wave plate is λ/4, the light intensity at the three focal points 42, 43 and 44 is almost the same, and when the thickness (h) of the wave plate is 3λ/4, the light intensity at the three focal points 42, 43 and 45 is almost the same. Accordingly, light intensity distribution between focal points may be adjusted by adjusting the thickness (h) of each of the wave plates from 0 to λ or to λ or higher.

Figure 12:
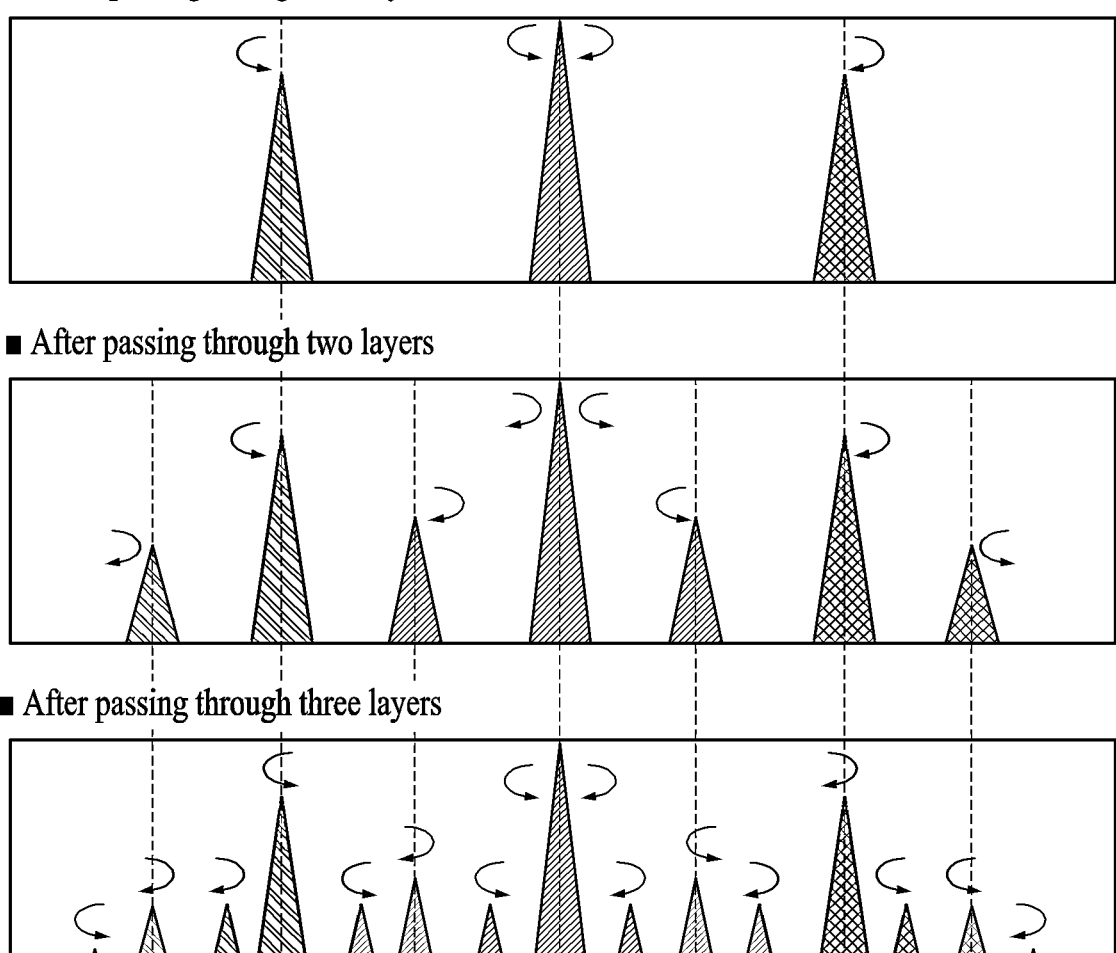
FIG. 12 illustrates the number of focal points formed after incident light passes through a wave plate layer according to an embodiment of the present disclosure.

FIG. 12 illustrates the number of focal points formed after incident light passes through a wave plate layer according to an embodiment of the present disclosure.

As shown in FIG. 12, the number of focal points formed dependently upon the number of layers of the wave plate is a value calculated by Equation 4 above.

Meanwhile, a method for predicting the light intensity at a focal point position is as follows. Specifically, when RHCP or LHCP is incident on the wave plate 200, the efficiency of converting it into polarized light in the opposite direction can be obtained as shown in Equation 5 below:

$$\eta(\lambda) = \sin^2\left(\frac{\Gamma}{2}\right) \qquad \langle \text{Equation 5} \rangle$$

where $$\Gamma = \frac{2\pi}{\lambda}\Delta n d,$$

and this means phase delay (phase change of incident light). λ represents the wavelength of incident light, Δn represents the birefringence of a wave plate, and d represents the thickness of the wave plate.

In incident light that is linearly polarized light, RHCP and LHCP are present in the same ratio. When linearly polarized light is incident on a wave plate, the direction of circularly polarized light included in the incident light changes. For example, RHCP included in linearly polarized light changes into LHCP. That is, as linearly polarized light passes through the wave plate, it experiences geometric phase delay as the LHCP and RHCP have opposite signs. Here, the remaining light that is not converted while passing through the wave plate is not affected by geometric phase delay and passes through the wave plate as linearly polarized light. Equation 5 shows the efficiency (referred to as polarization conversion efficiency) of passing through the wave plate without being polarized, and the light intensity at the location where each focal point is formed is affected by the polarization conversion efficiency.

Even when multiple wave plates are arranged, the light intensity at the location where each focal point is formed can be sufficiently predicted using Equation 5.

Meanwhile, a method of determining a focal point position when the wave plate layer is disposed in the contact lens is as follows. For explanation, FIGS. 6 and 7 are referred to again. As shown in FIG. 6, when there is one wave plate 20', the number of focal points is three (F-1, F-2 and F-3) according to Equation 3 (or Equation 4). Meanwhile, if the wave plate 20' has a thickness where a half-wavelength phase delay occurs, linearly polarized light is not generated, so the number of focal points is two (see FIG. 7(*a*)).

Each focal point position can be obtained as shown in Equation 6 below:

$$\frac{1}{f_{1,2,3}} = \frac{1}{f_{FL}} + \frac{1}{f_{WL-1}} \qquad \langle \text{Equation 6} \rangle$$

where $f_{1,2,3}$ represents the focal distances at respective focal positions after passing through a wave plate, $f_{FL}$ represents the focal length of a refractive lens, and $f_{WL-1}$ represents the focal length of the wave plate.

With regard to the focal length ($f_{WL-1}$) of the wave plate, when incident light is circularly polarized light and passes through the wave plate, the sign changes while experiencing phase delay, as described above. Accordingly, when a focal length by RHCP is $+f_{WL-1}$, a focal length by LHCP is $-f_{WL-1}$. When LHCP and RHCP pass through the wave plate, they are converted into circularly polarized light with opposite signs, so the wave plate functions like a convex lens for one circularly polarized light and like a concave lens for the other circularly polarized light. Meanwhile, if incident light is linearly polarized light, the focal length is infinite.

Equation 6 is a formula for calculating three focal lengths by one wave plate. However, when multiple wave plates are arranged, each focal length formed by the wave plates can be calculated by repeating Equation 6 as many times as the number of wave plates. Specifically, if the number of wave plates increases by one in the state of FIG. 6, each focal length can be obtained by adding $$\frac{1}{f_{WL-2}}$$

to the right side of Equation 6. Here, the increased number of focal points can be obtained by Equation 4. This can be generalized as in Equation 7 below:

$$\frac{1}{f_N} = \frac{1}{f_{FL}} + \frac{1}{f_{WL-1}} + \frac{1}{f_{WL-2}} + \dots + \frac{1}{f_{WL-N}} \qquad \langle \text{Equation 7} \rangle$$

where $f_N$ represents a focal length after passing through a last wave plate, and $f_{WL-N}$ represents the focal length of each wave plate.

In summary, when a phase distribution between neighboring wave plates of the contact lens made of multilayer wave plates according to the present disclosure satisfies a complementary relation, the number of focal points can be changed by adjusting the thickness of the wave plates, and the positions of focal points can be changed by adjusting the phase distribution of each of the wave plates (see Equations 1 and 7). Here, the adjusted focal points may be divided into a near focal point, a middle focal point and a far focal point depending on setting. Accordingly, various focal points may be formed depending on the visual condition of a contact lens user and the purpose of use according to the present disclosure.

Meanwhile, when the wave plate layer 20 according to the present disclosure is placed in a contact lens, the light intensity distribution of multiple focal points is created spatially along the diametric distance of the contact lens as moving away from the last wave plate in the Z-axis direction when incident light passes through the contact lens. That is, focal points formed through the contact lens according to the present disclosure may be created spatially as well as in the Z-axis direction.

FIGS. 13A to 13F illustrate various embodiments in which the wave plate layers of the present disclosure are placed in a contact lens.

In the contact lens made of multilayer wave plates according to the present disclosure, the wave plate layers 20 satisfying a complementary relation are disposed between the corneal protective layer 10 and the lens surface layer 30. Here, the wave plate layers 20 may be disposed on the corneal protective layer 10 in an appropriate form considering various conditions such as the surrounding environment (e.g., indoors or outdoors, etc.) of a contact lens wearer, a user's eye condition (e.g., hyperopia, myopia, etc.) and changes in pupil size. Meanwhile, the corneal protective layer 10 may be divided into a central region, which is a central part, and a peripheral region, which is a peripheral part. Here, the area of the central region may be set in various ways depending on a designer's intention. The wave plate layers 20 may have various shapes (e.g., a circular, oval, polygonal or annular shape, etc.), the number of the wave plate layers 20 may be various, and the wave plate layers may be disposed in the central region or peripheral region.

Figure 13A:
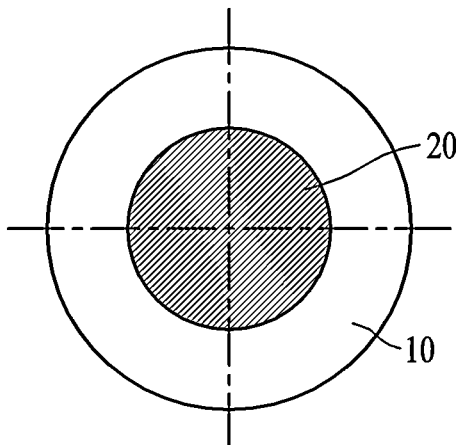
FIGS. 13A to 13F illustrate various embodiments in which the wave plate layers of the present disclosure are placed in a contact lens.
Figure 13B:
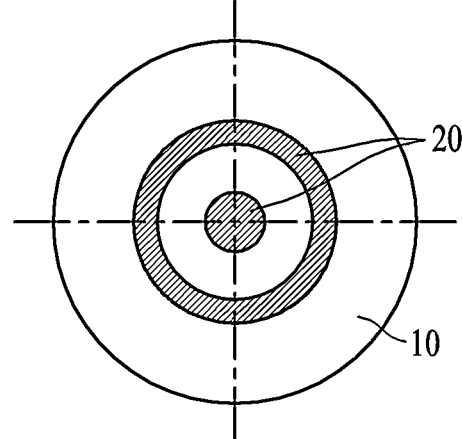
Figure 13C:
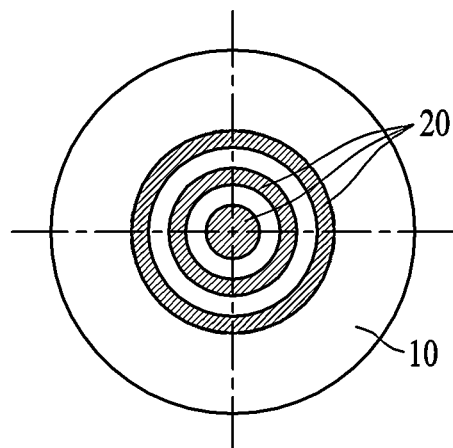

In embodiments shown in FIGS. 13A to 13C, the wave plate layer 20 is basically disposed in the central region of the corneal protective layer 10. This embodiment may be suitable when a contact lens wearer is outdoors.

In the embodiment shown in FIG. 13A, the wave plate layer 20 is formed in a substantially circular shape and is disposed only in the central region of the corneal protective layer 10. Here, the area of the wave plate layer 20 is smaller than the area of the corneal protective layer 10.

In the embodiment shown in FIG. 13B, one wave plate layer 20 is placed in the central region, and another wave plate layer 20 is formed in an annular shape with a certain thickness to surround the central region and formed in a peripheral region spaced a certain distance in the radial direction from the central region.

In the embodiment shown in FIG. 13C, one wave plate layer 20 is disposed in the central region, and two wave plate layers 20 with different radii are formed in an annular shape with a certain thickness to surround the central region and formed in a peripheral region spaced a certain distance in the radial direction from the central region.

Figure 13D:
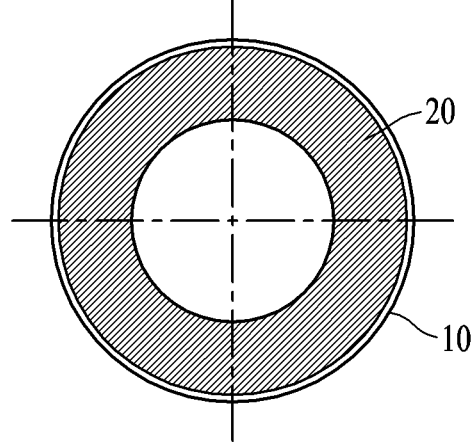
Figure 13E:
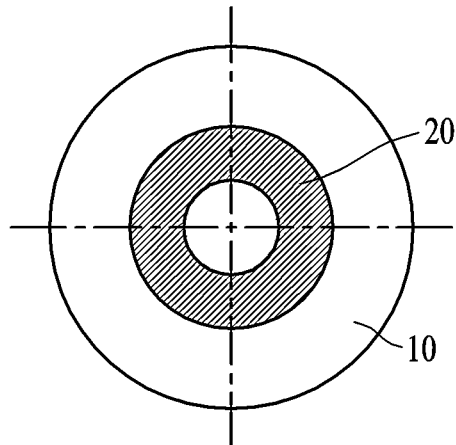
Figure 13F:
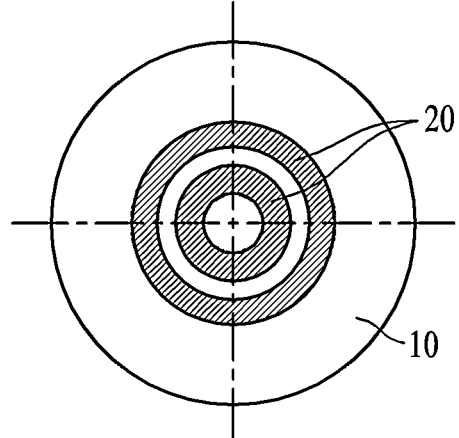

In the embodiments shown in FIGS. 13D to 13F, the wave plate layer 20 is basically disposed in the peripheral region excluding the central region of the corneal protective layer 10. This embodiment may be suitable when a contact lens wearer is indoors.

In the embodiment shown in FIG. 13D, the wave plate layer 20 is formed an annular shape with a certain thickness to surround the periphery of the corneal protective layer 10 and disposed in a peripheral region of the corneal protective layer 10. In the embodiment shown in FIG. 13E, one wave plate layer 20 is formed in an annular shape having a size smaller than the corneal protective layer 10 and having a certain thickness and disposed in a peripheral region excluding the central region of the corneal protective layer 10.

In the embodiment shown in FIG. 13F, one wave plate layer 20 is formed in an annular shape with a certain thickness and disposed in a first peripheral region excluding the central region, and another wave plate layer 20 is formed in an annular shape with a certain thickness and disposed in a second peripheral region spaced a certain distance away from the first peripheral region while surrounding the first peripheral region.

However, the present disclosure is not limited to the embodiments shown in FIGS. 13A to 13F. The wave plate layer 20 disposed in the central region may have various shapes such as a circular, oval, or polygonal shape, as described above. In addition, the wave plate layer 20 disposed in the peripheral region may have a semi-ring shape spaced a certain distance apart in the outer direction of the central region, a shape arranged at regular intervals in the circumferential direction with the same radius, or the like.

Meanwhile, the total number of wave plates, the curvature of the refractive lens surface, the distribution of the refractive index of each of the wave plates, and the like in the present disclosure may be varied to achieve the refractive compensation required for distance and near vision with other lenses in a visual system. In addition, the wave plate layer 20 may be disposed in the entire or partial region of the corneal protective layer 10.

The present disclosure has been described with reference to an embodiment shown in the attached drawings, but this is merely illustrative, and those skilled in the art will recognize that various modifications and other equivalent embodiments are possible therefrom. Therefore, the true scope of protection of the present disclosure should be determined only by the appended claims.

What is claimed is:

1. A contact lens made of multilayer wave plates, the contact lens comprising:

a lens surface layer;

a corneal protective layer; and a wave plate layer in which two or more wave plates composed of a birefringent material are stacked and which is disposed between the lens surface layer and the corneal protective layer, and phases of neighboring wave plates in the wave plate layer have opposite phase signs so as to complement each other.

2. The contact lens according to claim 1, wherein, when a thickness of one or more wave plates in the wave plate layer changes, light intensity at a position where focal points are formed changes accordingly.

3. The contact lens according to claim 2, wherein, when a thickness of the wave plate layer changes such that a light intensity at a position where one focal point is formed becomes 0, the number of focal points changes.

4. The contact lens according to claim 1, wherein the number of focal points generated by the wave plate layer is calculated by Equation 1 below:

$$N = 4 \times 2^{m-1} - 1 \qquad \langle\text{Equation 1}\rangle$$

where N represents the maximum number of focal points, and m represents the number of wave plates.

5. The contact lens according to claim 1, wherein positions of focal points generated by the wave plate layer is calculated as shown in Equation 2 below according to the number of the wave plates:

$$\frac{1}{f_N} = \frac{1}{f_{FL}} + \frac{1}{f_{WL-1}} + \frac{1}{f_{WL-2}} + \dots + \frac{1}{f_{WL-N}} \qquad \langle\text{Equation 2}\rangle$$

where $f_N$ represents a focal length after passing through a last wave plate, and $f_{WL\text{-}N}$ represents a focal length of each wave plate.

6. The contact lens according to claim 1, wherein, when a phase section (X) between a center of the wave plate layer and a point where a phase changes suddenly changes, positions where focal points are formed change accordingly.

7. The contact lens according to claim 1, wherein, in a same phase section (X) between neighboring first and second wave plates in the wave plate layer, a phase in the second wave plate decreases as a phase in the first wave plate increases.

8. The contact lens according to claim 1, wherein the wave plate layer is disposed in a central region of the corneal protective layer.

9. The contact lens according to claim 8, wherein the wave plate layer disposed in the central region has a smaller area than the corneal protective layer.

10. The contact lens according to claim 1, wherein, among the wave plate layer, one wave plate layer is disposed in a central region of the corneal protective layer, and another wave plate layer is disposed in a peripheral region excluding the central region at a certain distance spaced from the central region in a direction outside the central region.

11. The contact lens according to claim 10, wherein the wave plate layer disposed in the peripheral region is formed in an annular shape with a certain thickness.

12. The contact lens according to claim 10, wherein a plurality of wave plate layers are formed in an annular shape with a certain thickness in the peripheral region, have different radii, and are arranged at a certain distance away from an adjacent wave plate layer.

13. The contact lens according to claim 1, wherein the wave plate layer is disposed in a peripheral region excluding a central region of the corneal protective layer.

14. The contact lens according to claim 13, wherein the wave plate layer is formed to surround a periphery of the corneal protective layer.

15. The contact lens according to claim 13, wherein the wave plate layer is formed inside the corneal protective layer.

16. The contact lens according to claim 13, wherein the wave plate layer is formed in an annular shape with a certain thickness.

17. The contact lens according to claim 1, wherein, among the wave plate layer, one wave plate layer is disposed in a first peripheral region excluding a central region of the corneal protective layer, and another wave plate layer is disposed in a second peripheral region spaced a certain distance away from the first peripheral region in an outer direction of the first peripheral region.

18. The contact lens according to claim 17, wherein a plurality of wave plate layers are formed in an annular shape with a certain thickness in the second peripheral region, have different radii, and are arranged at a certain distance away from an adjacent wave plate layer.

\* \* \* \* \*